United States Patent [19]

Gritter

[11] Patent Number: 4,994,950

[45] Date of Patent: Feb. 19, 1991

[54] WAVEFORM GENERATOR FOR INVERTER CONTROL

[75] Inventor: David J. Gritter, Racine, Wis.

[73] Assignee: Eaton Corporation, Cleveland, Ohio

[21] Appl. No.: 560,112

[22] Filed: Jul. 31, 1990

[51] Int. Cl.[5] ......................................... H02M 7/5387
[52] U.S. Cl. ....................................... 363/41; 363/98; 318/811; 388/811
[58] Field of Search ...................... 363/41, 95, 98, 131, 363/132; 318/801, 811; 388/811

[56] References Cited

U.S. PATENT DOCUMENTS

| | | | |
|---|---|---|---|
| 4,656,572 | 4/1987 | Caputo | 363/41 |
| 4,720,777 | 1/1988 | Yokoi | 363/41 |
| 4,763,060 | 8/1988 | Takahashi | 318/811 |
| 4,800,478 | 1/1989 | Takahashi | 363/41 |
| 4,833,586 | 5/1989 | Inaba et al. | 363/41 |
| 4,860,186 | 8/1989 | Mackawa et al. | 363/41 |
| 4,870,556 | 9/1989 | Inaba et al. | 363/41 |
| 4,924,373 | 5/1990 | Inaba et al. | 363/41 X |

Primary Examiner—Peter S. Wong
Assistant Examiner—Emanuel Todd Voeltz
Attorney, Agent, or Firm—Krass & Young

[57] ABSTRACT

The inverter includes a low voltage microcontroller referenced to ground potential and a waveform generator coupled to the microcontroller through a serial data link including optical isolation devices. The waveform generator floats at the negative bus potential of the DC source for the inverter. The waveform generator produces switching signals for the inverter under control of the microcomputer. The waveform generator, serial communications circuitry and other support circuits are all part of a single application specific integrated circuit. Registers store control parameters from the microcontroller, and counters, a look up table and a state machine derive pulse width modulated switching commands to achieve motor control for a 60° sector of motor field rotation and repeat the derivation of similar switching commands for each subsequent sector. A pulse director applies the pulses to the correct motor phases for a given sector.

6 Claims, 6 Drawing Sheets

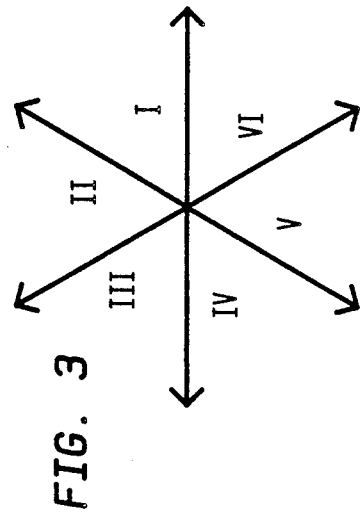
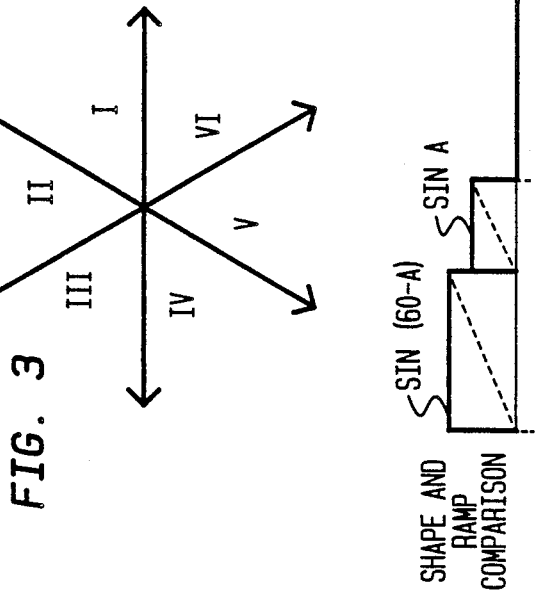
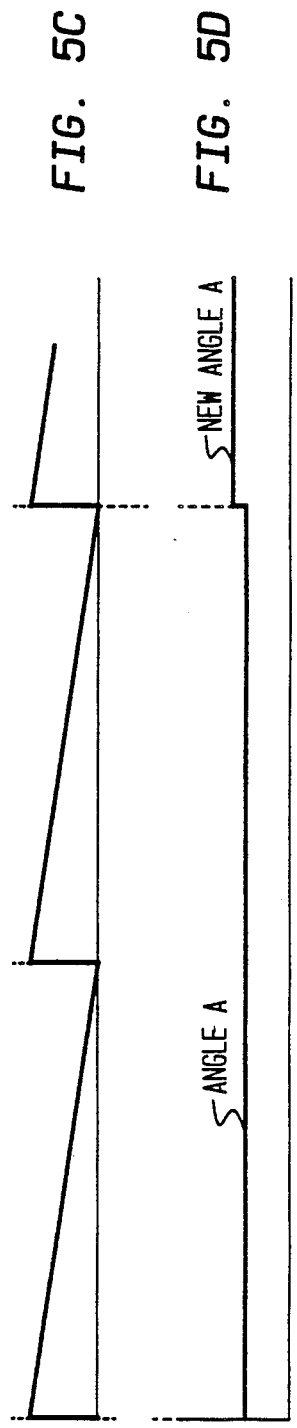

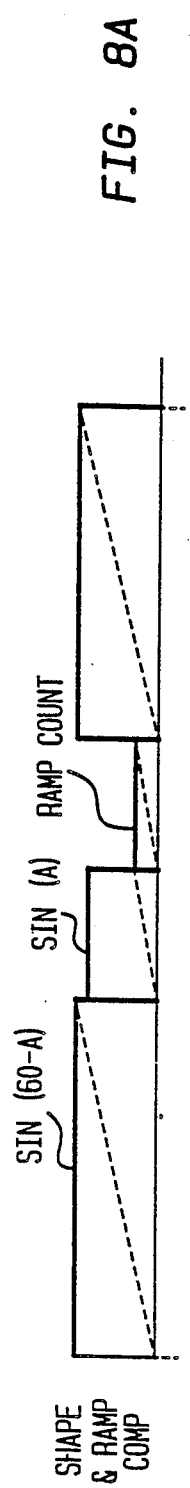
FIG. 8A
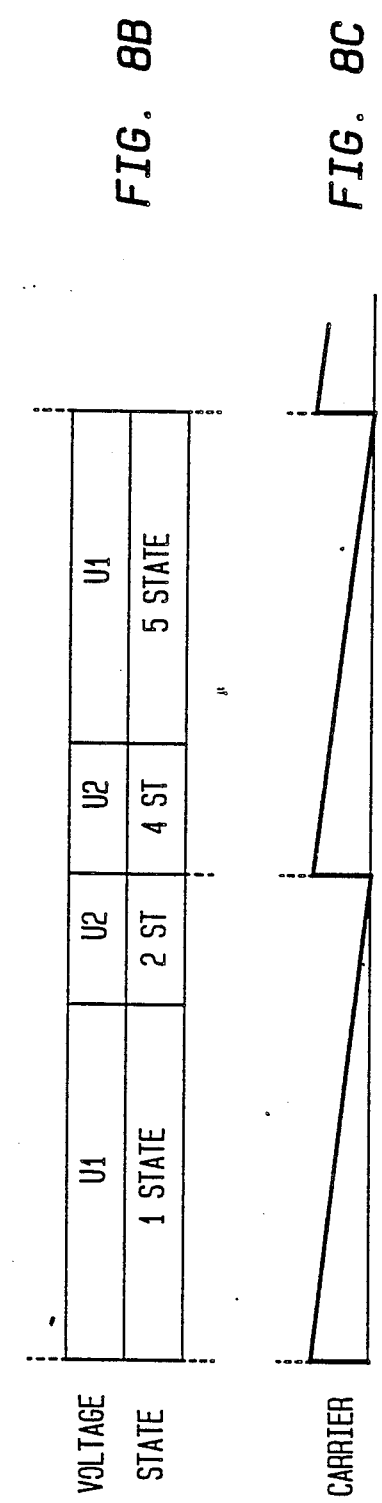
FIG. 8B
FIG. 8C
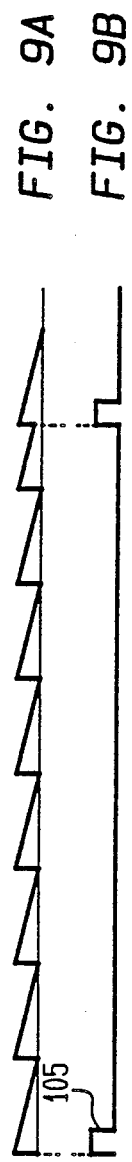
FIG. 9A
FIG. 9B

WAVEFORM GENERATOR FOR INVERTER CONTROL

FIELD OF THE INVENTION

This invention relates to controls for an AC inverter for a three phase motor and particular to a waveform generator for pulse width modulation of such an inverter.

BACKGROUND OF THE INVENTION

An inverter is used to provide AC current for a motor drive from a source of DC voltage such as an AC line rectified to energize a pair of DC busses with several hundred volts. Transistor switches selectively couple each phase of the motor to the high and low DC voltage busses for short periods to properly energize each phase of the motor. Pulse width modulation (PWM) is generally used to control each of the switches. When properly controlled this allows the frequency and magnitude of stator voltage applied to an induction motor so as to maintain constant flux in the motor over a wide speed range and to substantially reduce harmonics in the current supplied to the motor.

It is known to control the inverter switching digitally using a waveform generator in combination with a microcontroller programmed to instruct the waveform generator operation on the basis of desired motor operation and feedback information from the motor. The waveform generator then outputs inverter switching signals to energize the motor. The microcontroller affords an operator interface with the inverter. Application specific integrated circuits (ASIC) are known for electronic circuitry dedicated to a particular function and has several advantages. To effectively utilize such technology it is necessary to design the circuit in a manner to optimize its advantages and to avoid the inherent drawbacks. Such a design for waveform generation in an adjustable frequency drive requires the PWM algorithm which is used in the control be reduced to a set of gates and registers in a manner that minimizes the complexity of the circuit.

SUMMARY OF THE INVENTION

It is therefore an object of the invention to provide a digital waveform generator for adjustable frequency inverter control.

It is a further object to provide such a circuit which is suitable for ASIC implementation.

The invention is carried out in a control for an inverter for supplying pulse width modulated voltage from a DC bus to a three phase variable frequency induction motor having a microcontroller for determining desired motor operation by outputting frequency, carrier period and duty cycle parameters, and a waveform generator responsive to said parameters for commanding voltage vectors for inverter control, the waveform generator comprising: holding registers for each of the frequency, carrier period and duty cycle parameters; carrier period means responsive to the carrier period parameter for generating a carrier signal at each half period; a look up table containing two sets of sine functions; a state machine for sequentially assuming a plurality of states in each carrier period and for commanding a specific voltage vector for each state, the state machine having an address associated with each state for selecting which set of sine functions to address; means for generating angle values from the frequency parameter, and for addressing the look up table on the basis of the angle value and the state machine address to select a sine value; means responsive to the duty cycle parameter for producing a ramp signal having a slope determined by the duty cycle parameter; comparator means for comparing the ramp signal with the selected sine value to produce a signal when the ramp signal reaches the value of the selected sine value; the state machine including transition means responsive to the comparator means signal and the carrier signal for changing from one state to another, whereby a sequence of voltage vectors are commanded by the state machine at a rate determined by the frequency parameter and each having a duration depending on the selected sine value and the slope of the ramp signal; and means responsive to the means for generating angle values and to the commanded voltage vectors for issuing switching signals to the inverter.

BRIEF DESCRIPTION OF THE DRAWINGS

The above and other advantages of the invention will become more apparent from the following description taken in conjunction with the accompanying drawings wherein like references refer to like parts and wherein:

FIG. 3 is a diagram of AC motor field rotation sectors;

FIG. 4 is a vector diagram of motor phase voltages for a single sector;

FIG. 5 parts (a) through (d) are illustrations of signals generated and state machine states in the waveform generator according to the invention;

FIG. 8 parts (a) through (c) are illustrations of signals generated and state machine states in the waveform generator for over-modulation operation, according to the invention; and FIG. 9 parts (a) and (b) are illustrations of carrier signal and sector signals, respectively, for synchronous operation.

DESCRIPTION OF THE INVENTION

Figure 1:
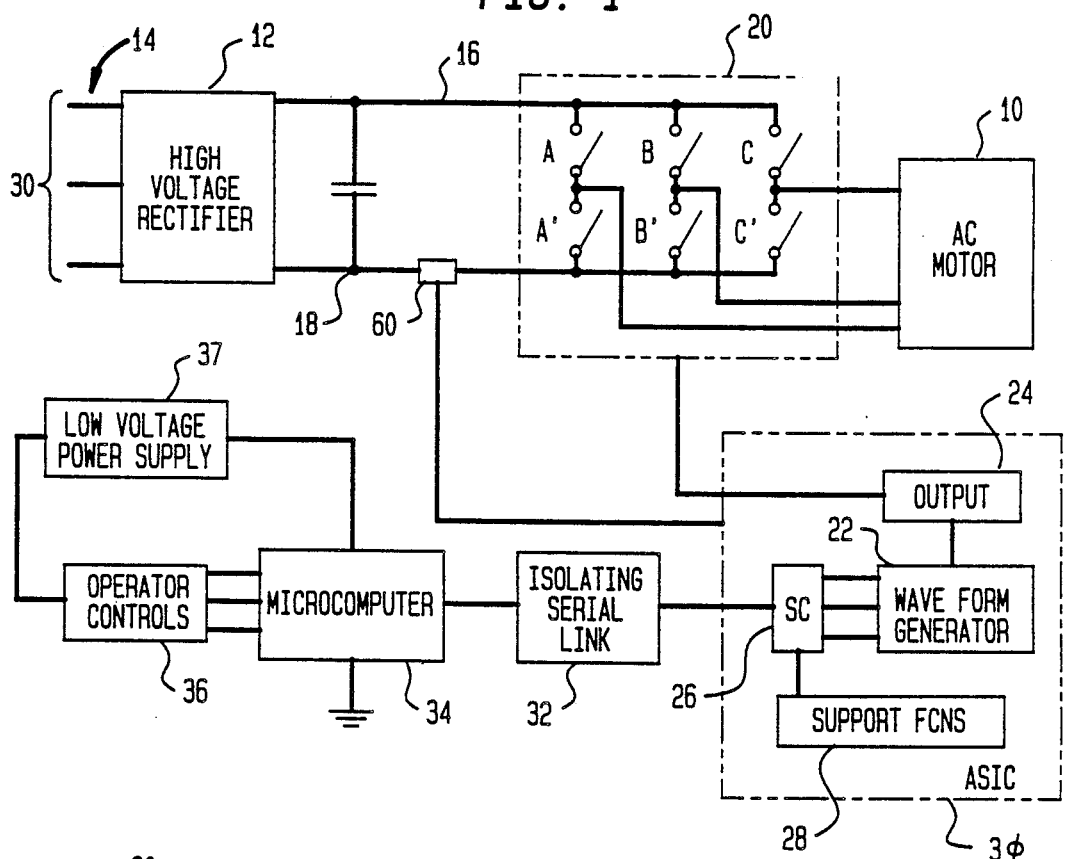
FIG. 1 is a block diagram of an inverter and control circuit according to the invention.

OVERALL SYSTEM: The diagram of FIG. 1 shows the overall system for controlling a three phase asynchronous (induction) AC motor 10. A DC power source here depicted as a rectifier 12 coupled to a three phase AC line 14 provides DC voltage on positive and negative DC busses 16 and 18. Of course single phase AC may be rectified as well. The voltage on the busses 16 and 18 is typically several hundred volts. The busses are not referenced to ground and thus float with respect to ground. Typically the negative bus is about 390 volts below ground. An inverter 20 of conventional structure comprises a plurality of transistor switches connected serially in pairs A—A', B—B' and C—C' across the positive and negative busses and each switch pair junction point is connected to an input of the motor 10 to energize a phase of the motor.

The switching convention used here is that if either switch of a pair is closed the other switch of the pair must be open; thus A' means A-not and always has the opposite state of A. An exception is imposed by an anti-overlap function which may hold both switches open for an instant during a switching interval to insure that they are not both closed at any time. By selectively opening and closing the switches the three phases of the motor 10 are energized by many short pulses to create average current in each phase appropriate to the desired motor operation.

OPTICAL ISOLATION: The trigger pulses for Operating the transistor switches of inverter 20 are produced by a waveform generator 22 and coupled to the inverter 20 via an output circuit 24. The waveform generator 22, the output circuit 24, a serial communication (SC) circuit 26 and other support functions 28 described below are all part of a single ASIC chip 30 which is referenced to the potential of the negative bus 18. An isolating serial link 32 including two opto-isolators couples signals between the serial communication circuit 26 and microprocessor logic or microcontroller 34 which is referenced to ground potential and which generates signals to control the operation of the waveform generator 22. A conventional low voltage power supply 37 supports the microcontroller 34 and controls 36. Operator controls 36 provide inputs to the microcontroller 34. The grounded state of the logic allows control signals from external hardware such as switches, potentiometers, relays, programmable controllers, etc. to be directly connected to this portion of the circuitry without concern for operator or installer safety or the need for high voltage wiring. Thus the microcontroller 34 and the operator controls afford an interface between the operator and the waveform generator 22 through the isolating link which protects both the operator and the microcontroller from the high voltages of the DC bus 18. The placement of the ASIC 30 in the high voltage side allows the three negative power switching devices A', B' and C' to be directly driven (the positive switching devices being switched through simple level shifting circuitry), and allows high switching frequencies without the need for expensive opto-couplers or pulse transformers. At the same time, the optical isolation required for the serial link is neither difficult nor expensive, particularly when the ASIC provides the high side serial communication circuitry and low common mode dV/dt rates are observed. Bus current can be sensed by a simple shunt resistor and voltage by resistive dividers, not shown. Positive bus voltage and each phase voltage is thus monitored. Average values of these analog signals are converted to digital form and sent through the serial port for control and readout purposes.

The ASIC 30 generates other control signals in addition to the normal gating signals. It includes PWM signal generators to provide analog references, and also provides for an external analog to digital converter. It communicates with the microcontroller 34 through a serial port which can be optically coupled with low cost components. The ASIC is programmed by the microcontroller by means of several addressable eight bit registers. Status information from the ASIC may be read by the microcontroller in a similar manner.

Figure 2:
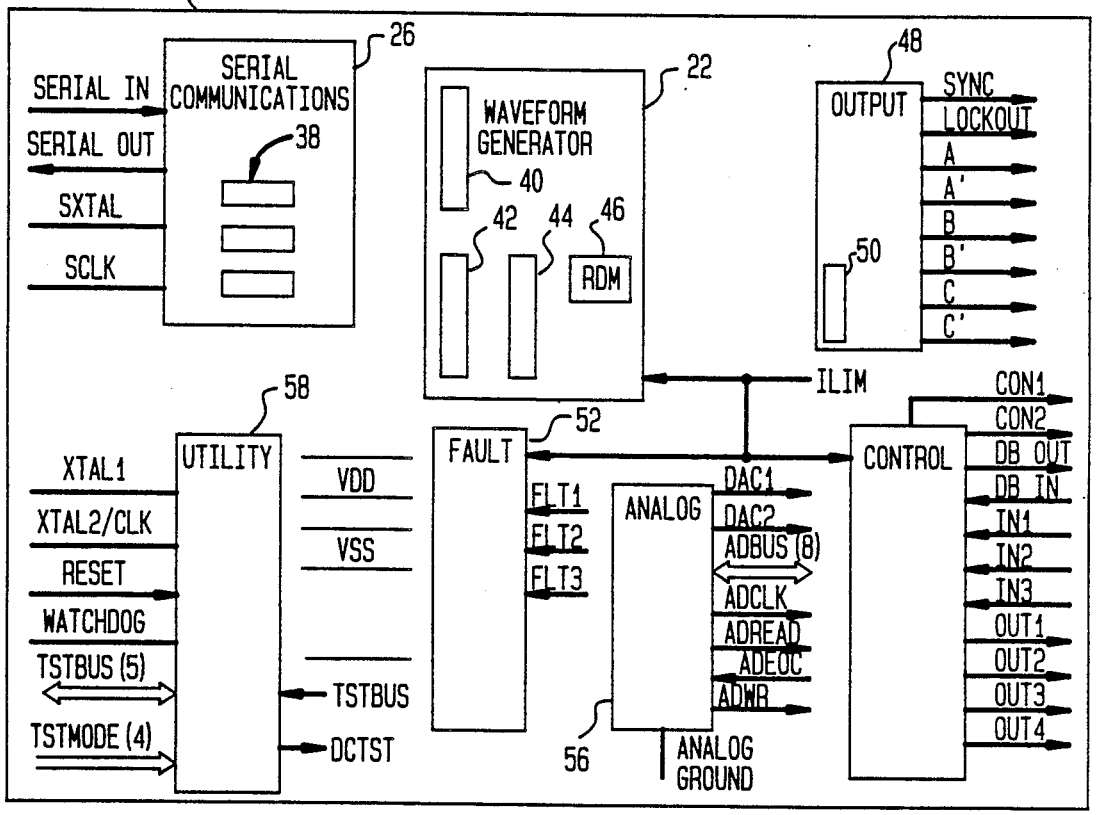
FIG. 2 is a diagram of an ASIC for waveform generation and inverter control at high voltage level according to the invention.

ASIC: While several technology choices are available, it is here preferred to use CMOS gate array technology to form the ASIC. The ASIC is shown in FIG. 2 and is divided into seven functional blocks. Each block has a set of registers associated with it by which the microcontroller establishes operating conditions or monitors the state of the ASIC or its inputs. For clarity, the signal busses interconnecting the blocks are not shown.

The serial communications block 26 is responsible for transferring data between the ASIC 30 and the microcontroller 34. It operates in an asynchronous mode, and provides error checking. Address registers 38 in this block point to the other registers in the chip. The waveform generator 22 is the heart of the drive. It accepts 16 bit values in three registers 40, 42 and 44 for output frequency, carrier period, and duty cycle, respectively. It also includes a ROM 46 embodying lookup tables of reference voltage values and logic driven by the register contents for addressing the look up tables and for deriving pulse width modulated switching signals. The waveform generator produces three output phase signals based on a well defined algorithm which allows over-modulation, current limit, and both synchronous and asynchronous carrier types of operation. It calculates the period of the output frequency at sixty degree intervals.

An output block 48 generates six gating signals from the three phase signals produced by the waveform generator 22. Its register 50 allows anti-overlap time to be programmed. It responds to an external current limit signal and to register bits which enable the output and allow phase interchange for reversing the motor. Three external fault signals and a current limit signal allow the fault block 52 to disable the drive and signal a fault to the microcontroller 34 through the serial port. A maximum current limit rate may be programmed. The fault block also monitors the gating signals and stores the number of the most recent gating signal to become active to allow diagnostic information to be displayed by the microcontroller.

A control block 54 provides additional external inputs and outputs. It also contains registers which allow the microcontroller to manipulate bit signals in other blocks.

Analog input and output is provided by two independent PWM signal generators and a parallel interface to an A/D converter in an analog block 56. This allows the microcontroller to monitor average bus current and to set current limit and dynamic braking references.

A utility block 58 provides a crystal oscillator, a watchdog timer, test circuitry, and a timing signal generator.

In operation of the ASIC chip, signals from the microcontroller are carried by the serial link 32 through an opto-isolator to the serial communications block which transfers the data to registers elsewhere on the chip according to addresses in the incoming signal. The data includes waveform information which is fed into the registers 40, 42 and 44 in the waveform generator 22. These registers are updated frequently by the microcontroller to continually control the waveform produced. The output of the waveform generator 22 is supplied to the output 48 which directly operates the negative inverter switches and operates the positive inverter switches through a simple level shifting circuit. An external current sensor 60 responsive to average bus current feeds a current signal to the analog circuit 56. Whenever the current exceeds a set limit, a limit signal is sent to the fault block 52, the control block 54 and the waveform generator. If this current limit occurs too often, the fault block issues a fault signal.

Three other external inputs to the fault block as well as a watch dog signal can trigger a fault signal. The effect of the fault signal is to shut down the output circuit 48 to terminate inverter operation, and to set a fault flag in a status register in the control block 54. For diagnostic purposes, the fault block also latches into a register a code representing the type of fault which occurred and the last switch signal issued. The microcontroller regularly queries the status register and if a fault is found it also queries the fault block register to determine the cause of the fault. A watch dog circuit in the utility block 58 is reset each time the microcontroller queries the status register. If the query fails to occur within a preset time period indicative of microcontroller or serial link failure, the watch dog circuit signals the fault block which issues a fault signal to turn off the inverter.

Thus the ASIC chip provides a self sufficient control circuit able to function at the voltage level of the inverter bus and requiring only control data from the microcontroller which can readily be supplied over the serial link which is serviced by a relatively inexpensive optical coupler.

WAVEFORM ALGORITHM: The paper "Analysis and Realization of a Pulse Width Modulator Based on Voltage Space Vectors" van der Broeck et al, Conf. Rec. 1986 Annual Meeting IEEE Ind. Appl. Soc., pp 244-251 which is incorporated herein by reference, describes a PWM technique for energizing a three phase AC machine with minimal distortion yet allows significant over- modulation. The full 360 revolution of the motor is divided into six 60° sectors I through VI as shown in FIG. 3. The currents in the three phases of the motor required to establish the rotating field of the stator in one sector is determined by sequentially applying the two available voltages U1 and U2 on the DC bus to two phases and varying the time interval of each phase energization in a proportion to achieve the correct vector angle A at any instant (FIG. 4) and then progressively changing the angle with time to effect the field rotation. For example, the voltage U1 is first applied by actuating switches A, B' and C' for a short interval and then actuating switches A, B and C' to apply voltage U2 for another interval, the ratio of the two periods determining the effective vector angle of the field. A feature of the technique is that the pulses are applied in symmetrical groups to reduce harmonics. After an interval of no voltage, the voltage U2 is again applied followed by the voltage U1. The angle of the vector is correctly calculated by varying one of the energization intervals according to the function sin (A) and the other interval according to sin (60-A).

The magnitude of the current is adjusted by using a variable duty cycle, that is, opening or closing all the positive switches so that no voltage is applied for a time. The interval of no voltage does not affect the angle, only the magnitude. When any sector has been completed the process is repeated for the ensuing sector, a different switch pattern being used to energize the phases appropriate for that sector. Thus pulse width modulation effects machine control where adjacent pulses actuate different switches for different intervals to create a rotating field vector and the pulse duty cycle determines the field strength or current in accordance with desired motor torque.

The algorithm employs a carrier frequency (1 kHz to 15 kHZ) which is much greater than the machine frequency. It is assumed that the carrier is fixed for a particular application as a matter of design. Each carrier half period is normally divided into three states, as illustrated in FIG. 5, the first two states being used to apply the two voltages U1 and U2 and the third state is used for the zero voltage (U3) interval. The periods of time spent in the first two states are determined by the values sin (A) and sin(60-A) which are stored in a look up table and which repeat at 60° intervals. These sine functions are compared to a free running counter whose rate of increment is inversely proportional to desired voltage amplitude.

Figure 6:
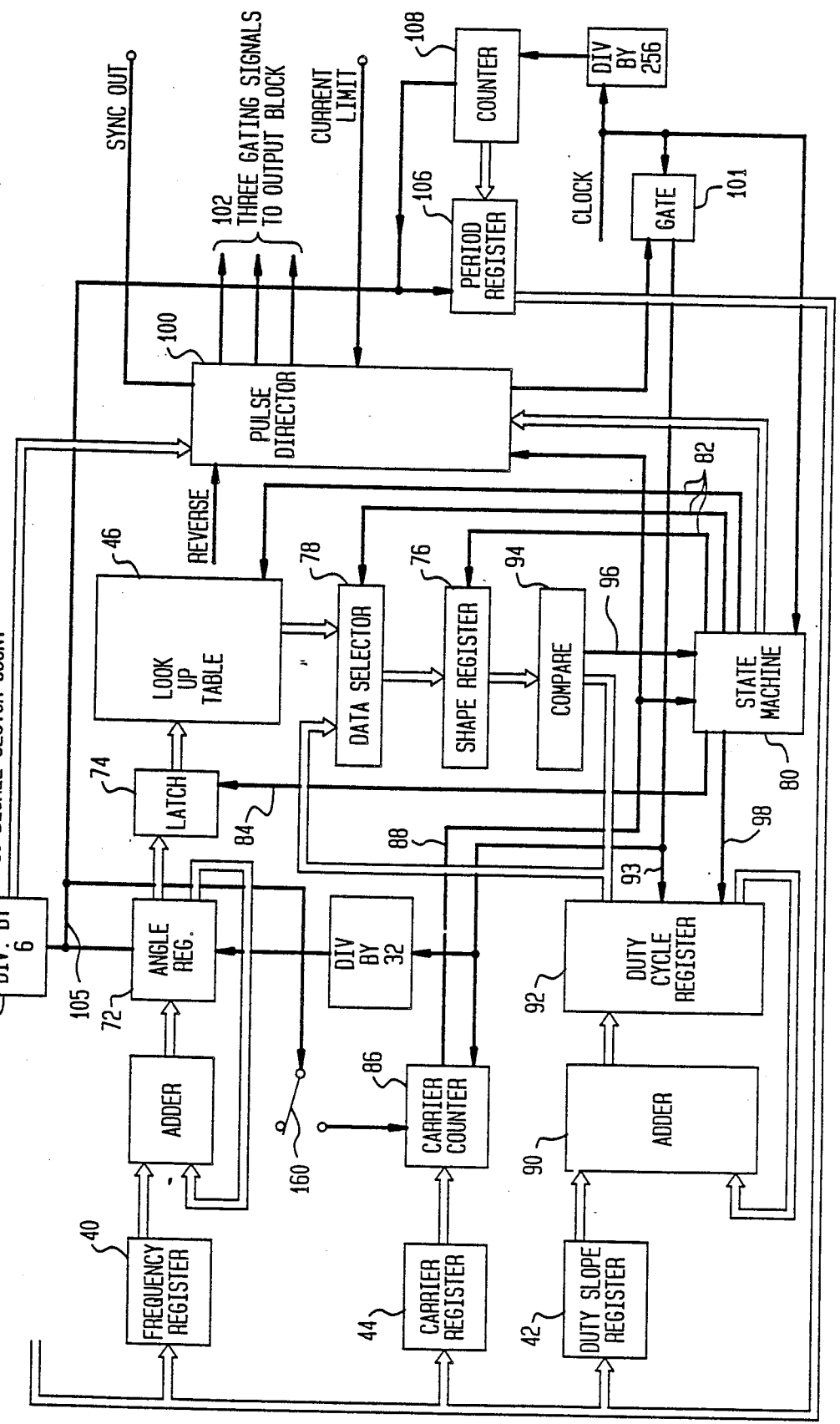
FIG. 6 is a functional diagram of the waveform generator implemented on an ASIC chip according to the invention.

WAVEFORM GENERATOR: Referring to FIG. 6 the waveform algorithm is implemented in the ASIC chip. It is necessary for the microcontroller 34 to establish the desired motor operation by providing via the serial data link the machine frequency which is stored in the frequency register 40, the carrier period which is stored in the carrier register 44, and the duty cycle which is a quantity related to carrier period divided by duty cycle and is stored in the duty slope register 42. The look up table for the two sine functions is stored in ROM 46. With this information, the waveform generator is able to output the required switching commands.

A stator angle calculator includes the frequency register 40, an adder 70, and an angle register 72 clocked at a fixed frequency. The angle register 72 is continuously incremented by the value of the frequency register 40. A portion of the angle register represents the ROM address of the angle A which is advanced to a latch 74 at the beginning of each carrier cycle as indicated in FIG. 5(d). The appropriate sine value is loaded from the table into a shape register 76 via a data selector 78. Outputs 82 from a state machine 80, described below, determine whether sin A or sin (60-A) is loaded into the shape register as well as the time of loading each value. A state machine output 84 also determines when a new angle may be latched into the ROM address.

The carrier register 44 is coupled to a carrier counter 86 which is loaded with the register 44 value and counts down, reloads and counts down again to produce the ramps of FIG. 5(c). When the counter 86 reaches zero it produces an output on line 88 which feeds into the state machine 80.

The duty cycle generator is a variable slope ramp generator. It is constructed from the duty slope register 42, an adder 90 and a duty cycle register 92 which serves as an accumulator. The upper bits of the register are fed to a comparator 94 for comparison to a timing value. The duty cycle register 92 is clocked at a fixed rate via line 93 to add the slope register 42 contents to register 92 thereby creating a ramp shown by the broken lines in FIG. 5(a). The ramp slope is thus determined by the contents of the duty slope register 42. As shown in FIG. 5, when the ramp reaches the sine value the state changes and the ramp is reset to zero. This is accomplished by the comparator 94 which produces an output on line 96 to the state machine when the duty cycle register 92 count is greater than the shape register 76 value. The state machine, in turn, produces a reset signal to the duty cycle register 92 on line 98. The reset signal can be used to hold the duty cycle register count at zero.

Pulse Director: A pulse director 100 determines from information on the present sector and a built-in table, which switches should be turned on for each vector and issues switch command signals on three output lines 102. The state machine 80 supplies the vector and timing information and a sector register 104 provides the sector information. The sector register 104 is a divide by six counter which is incremented by an overflow signal from the angle register 72 on line 105 whenever a 60° sector is completed. A current limit signal to the pulse director causes the pulse director 100 to gate the output signals to the same polarity to remove voltage from the motor. The pulse director also turns off a gate 101 to remove clock signals from the registers 72 and 92 and the counter 86 to freeze the action of the waveform generator as long as the current limit signal lasts.

The overflow or sector complete signal on line 105 from the angle register 72 also provides inputs to a period register 106 and a counter 108 which is clocked at a constant rate. At the end of each sector the counter value is loaded into the register 106 and the counter 108 is reset. Thus the period register holds a value which is a measure of the period and is used for feedback information to the microcontroller 34 to apprise the microcontroller of the period status in the event of an interruption by a current limit signal.

Figure 7A:
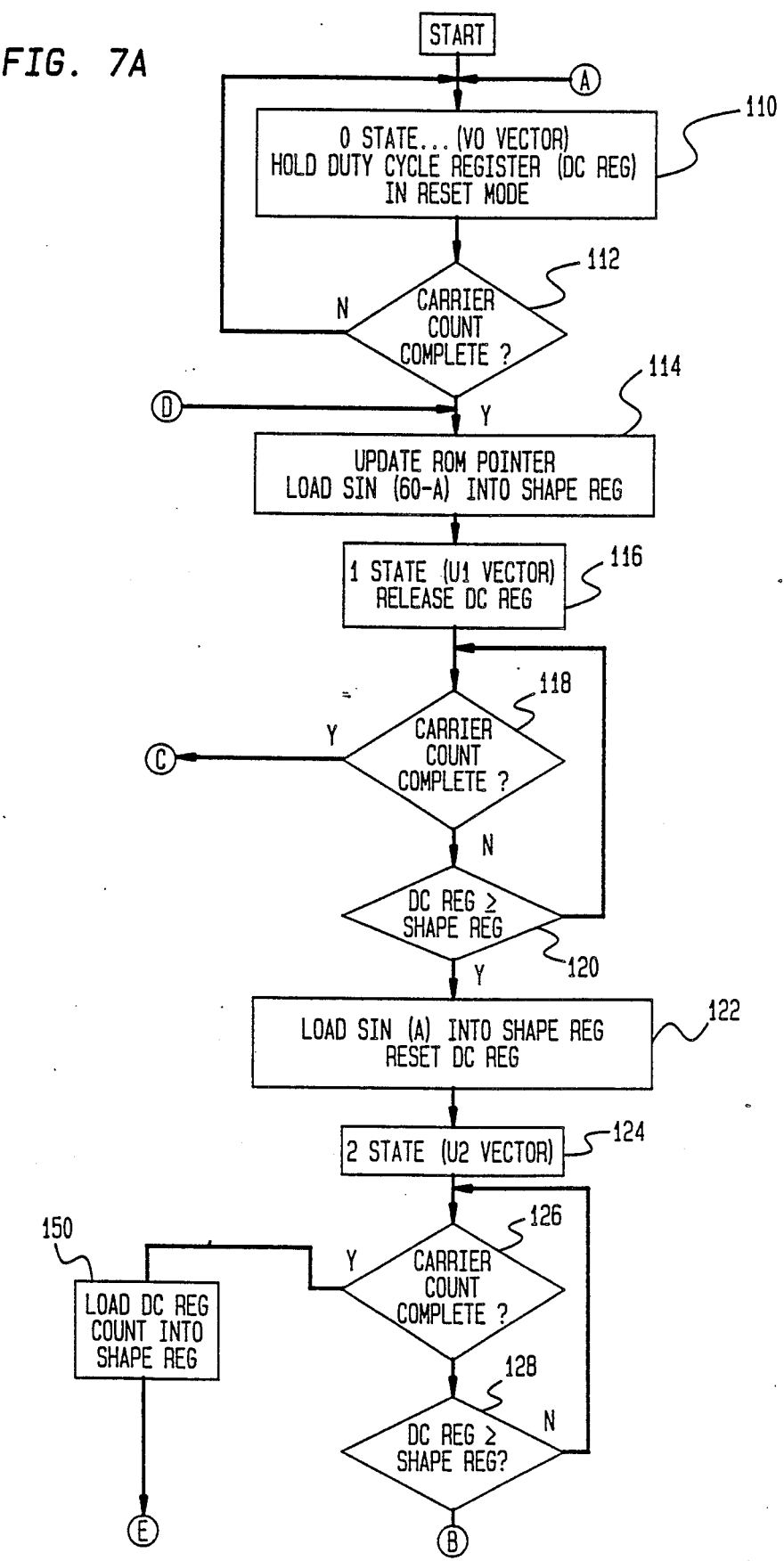
FIG. 7 parts (a) and (b) comprises a diagram of the state machine logic for the waveform generator of FIG. 6, according to the invention.
Figure 7B:
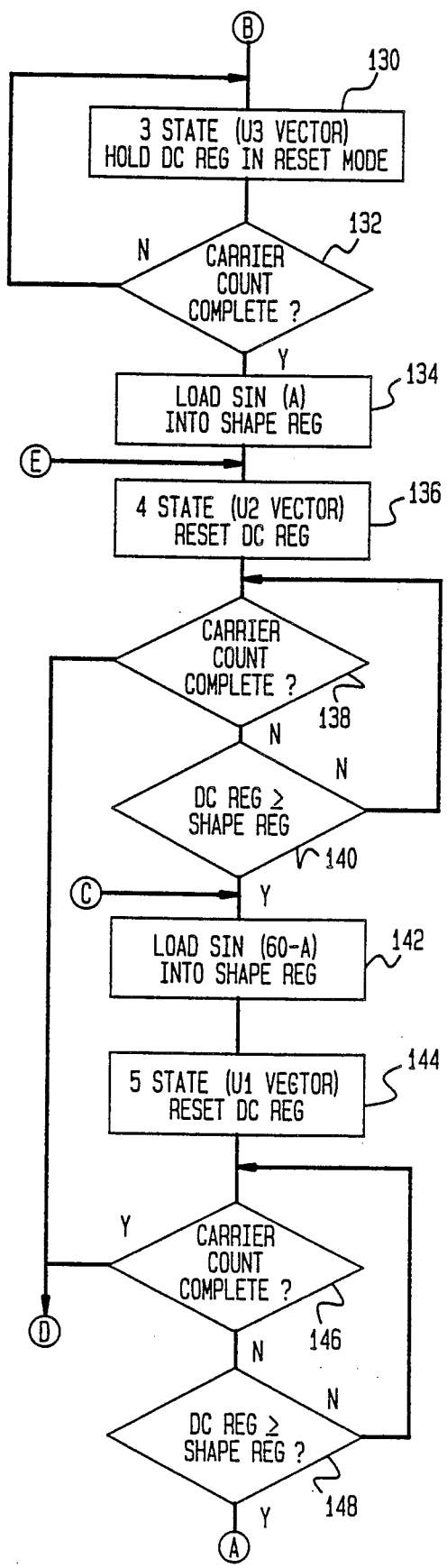

State Machine: The state machine 80 drives and coordinates the other components of the waveform generator. It is a logic circuit formed in the ASIC and is dedicated to the orderly operation of the generator. The chart of FIG. 7 illustrates the sequence of operation. Reference numerals in angle brackets <nn> refer to the numerals of blocks functions being described. In conjunction with FIG. 5, the timing and interaction of the several register outputs is readily under stood. Assuming that the machine enters state 0 at power up, the duty cycle register is held in reset mode <110>. When the carrier count is complete <112>, the row pointer is updated (via line 84), and sin(60-A) is loaded into the shape register 76 <114>. Then a transition is made to 1 state where the U1 vector is applied and the duty cycle register is released <116>. If the carrier count is not complete <118> and the duty register value reaches the sine value in the shape register <120>, sin(A) is loaded into the shape register and the duty cycle register is reset <122> and the transition to 2 state is made and the U2 vector is applied <124>. Again, if the carrier count is not complete <126> and the duty cycle register value reaches the shape register value <128>, the 3 state is entered <130> where the U3 vector obtains (no motor voltage) and the duty cycle register is held in reset mode. Then, when the carrier count is complete <132>, sin(a) is loaded into the shape register <134> and the 4 state is entered <136> where the U2 vector is again applied and the duty cycle register is reset and released. If the carrier count is not completed <138> and the duty cycle register count reaches the shape register value <140>, sin(60-A) is loaded into the shape register <142> and the transition to 5 state is made <144> where the vector U1 is applied and the duty cycle register is reset. If the carrier count is not complete <146> and the duty cycle register reaches the shape register value <148>, the transition to 0 state is made <110> where the cycle repeats.

This process is the regular progression of the state machine which sequences through all six states as shown in FIG. 5 and applies up to 100% modulation. At that point the 3 state and the 0 state are reduced to zero time period and, at over-modulation, the 2 state is truncated by the carrier count completion prior to the duty cycle register count reaching the shape register value as shown in FIG. 8. To assure that the 2 state and the 4 state have equal periods to maintain symmetry, the value of the duty cycle register is loaded into the shape register as indicated at FIG. 8(a). This is accomplished by the data selector 78 which is triggered by the state machine to load data from the duty cycle register 92 instead of from the table 46. Then during the 4 state the duty cycle register will reach the shape register value at the correct time. In FIG. 7, when the carrier count is complete at block 126, the duty cycle register is loaded into the shape register at block 150 and the state goes directly to 4 state. At the end of 5 state <144> the carrier count is complete <146> and the 0 state is bypassed and the next operation is block 114 which loads updated information into the registers for the next cycle starting at 1 state.

In the limiting over-modulation condition the state machine toggles between 1 state and 5 state to produce a square wave input to the motor. In FIG. 7, if the carrier count is completed while in 1 state <118>, the state machine goes to block 142 to load the shape register and then to block 144 to enter 5 state. Then if the carrier count is completed <146> the logic flows to block 114 to prepare for the 1 state.

The operation of the waveform generator is usually asynchronous but it is sometimes desirable, particularly at high stator frequency, to operate synchronously wherein the carrier frequency is an integral multiple of stator frequency. A switch 160 under control of the microcontroller 34 can be closed to command synchronous operation. The switch connects the sector completion signal on line 105 to the carrier counter 86 to force a reset of the counter and to issue a carrier count complete signal. The microcontroller 34 sets stator frequency and carrier period values which approximate synchronous conditions so that at the end of a 60° sector the carrier count is close to zero as shown in FIG. 9. When the sector completion signal is issued on line 105 any error in the carrier count is removed by resetting the carrier count to zero and the state machine to 1 state via the carrier count completion signal and the new 60° sector is begun. As shown in FIG. 9(a) an approximately even number of carrier half cycles occur between the sector completion signals on line 105 shown in part (b) of FIG. 9. The last half cycle is truncated at the end of the sector.

It will be seen that the waveform generator is able to produce a PWM output for controlling the inverter switches in a manner to produce a rotating field having a frequency dependent on the contents of the frequency register and a magnitude dependent on the contents of the duty slope register. The switching pulses are produced at a rate determined by the contents of the carrier register. Generally four pulses per period are produced unless a square wave is produced at two pulses per period. The waveform generator can smoothly change into and out of an over-modulation condition and can switch between synchronous and asynchronous operation. The microcontroller is in control of the waveform generator at all times except when a current limit is detected or a fault is detected in which case the generator function is frozen for a time or stopped altogether. The register contents can be updated at any time by the microcontroller.

The embodiments of the invention in which an exclusive property or privilege is claimed are defined as follows:

1. In a control for an inverter for supplying pulse width modulated voltage from a DC bus to a three phase variable frequency induction motor having a microcontroller for determining desired motor operation by outputting frequency, carrier period and duty cycle parameters, and a waveform generator responsive to said parameters for commanding voltage vectors for inverter control, the waveform generator comprising:

holding registers for each of the frequency, carrier period and duty cycle parameters;

carrier period means responsive to the carrier period parameter for generating a carrier signal at each half period;

a look up table containing two sets of sine functions;

a state machine for sequentially assuming a plurality of states in each carrier period and for commanding a specific voltage vector for each state, the state machine having an address associated with each state for selecting which set of sine functions to address;

means for generating angle values from the frequency parameter, and for addressing the look up table on the basis of the angle value and the state machine address to select a sine value;

means responsive to the duty cycle parameter for producing a ramp signal having a slope determined by the duty cycle parameter;

comparator means for comparing the ramp signal with the selected sine value to produce a signal when the ramp signal reaches the value of the selected sine value;

the state machine including transition means responsive to the comparator means signal and the carrier signal for changing from one state to another, whereby a sequence of voltage vectors are commanded by the state machine at a rate determined by the frequency parameter and each having a duration depending on the selected sine value and the slope of the ramp signal; and means responsive to the means for generating angle values and to the commanded voltage vectors for issuing switching signals to the inverter.

2. The invention as defined in claim 1 wherein the look up table contains sine functions for a 60° sector of waveform generation;

the means for generating angle values generates progressively increasing angles from zero to 60°, issues a sector signal when 60° is attained, and then resets and repeats the angle generation;

and including means for sampling the generated values once each carrier period and for addressing the look up table with the sampled value; and the means for issuing switching signals is responsive to the sector signal and the voltage vectors.

3. The invention as defined in claim 1 wherein for regular modulation a first voltage vector comprises the bus voltage applied with a given polarity to a first motor phase for the duration of corresponding states, a first voltage vector comprises the bus voltage applied with a given polarity to a first motor phase for the duration of corresponding states, a second voltage vector comprises the bus voltage applied with a given polarity to a second motor phase for the duration of corresponding states, and a third vector comprises a zero voltage applied to all phases for the duration of corresponding states; and including means for applying each vector for the same duration each time it is applied in a given carrier period.

4. The invention as defined in claim 3 wherein for over modulation, the duration of the first vector is so large in each carrier half cycle that it preempts the time for the third vector and at least part of the time for the second vector, so that the third vector is not applied, and the second vector duration is foreshortened in accord with the degree of over-modulation.

5. The invention as defined in claim 1 wherein during regular modulation the states for the first and second vectors are terminated in each half period by the comparator signal when the ramp signal reaches the selected sine value, during over modulation the state for the second vector is terminated in the first carrier half period by the carrier signal before the comparator signal is issued;

the waveform generator including means effective in the second carrier half period during over-modulation to assure a second vector duration equal to its duration in the first half comprising means for substituting in the comparator means the value of the ramp signal attained at the end of the first half period so that the comparator signal for terminating the second vector state is produced when the ramp signal reaches the substituted value.

6. The invention as defined in claim 1 wherein for asynchronous operation the carrier period is independent of stator frequency and for synchronous operation the microcontroller issues parameters scaled to achieve approximately an integral number of carrier periods in each sector, and wherein the means for generating angle values produces a sector signal at the completion of each 60° sector, and means effective during synchronous operation and responsive to the sector signal for resetting the carrier period means to begin a new series of carrier periods for each sector.

* * * * *